United States Patent [19]

Grawey

[11] 4,155,393
[45] May 22, 1979

[54] PNEUMATIC TIRE CARCASS

[75] Inventor: Charles E. Grawey, Peoria, Ill.

[73] Assignee: Caterpillar Tractor Co., Peoria, Ill.

[21] Appl. No.: 811,492

[22] Filed: Jun. 30, 1977

[51] Int. Cl.² .............................................. B60C 13/00
[52] U.S. Cl. ............................ 152/353 R; 152/352 R
[58] Field of Search ........... 152/353 R, 352 R, 352 C, 152/354, 330 RF, 323–325

[56] References Cited

U.S. PATENT DOCUMENTS

| D. 63,327 | 11/1923 | Roper | 152/353 R |
|---|---|---|---|
| 1,244,209 | 10/1917 | Hickman | 152/353 R |
| 1,428,817 | 9/1922 | Swan | 152/209 R |
| 1,827,668 | 10/1931 | Musselman | 152/352 |
| 2,146,942 | 2/1939 | Czerwin | 152/353 R |
| 2,303,164 | 11/1942 | Hawkinson | 152/153 |
| 2,418,064 | 3/1947 | Austin | 152/353 R |
| 3,421,566 | 1/1969 | Sidles et al. | 152/330 RF |
| 3,818,965 | 6/1974 | Newman | 152/209 R |
| 3,938,572 | 2/1976 | Nishi et al. | 152/209 R |

Primary Examiner—Francis S. Husar
Assistant Examiner—Lawrence E. Williams
Attorney, Agent, or Firm—Charles E. Lanchantin, Jr.

[57] ABSTRACT

A pneumatic tire carcass has a tread portion, a pair of sidewalls connected to the tread portion, each of the sidewalls having an outer surface, and a plurality of grooves formed in the outer surface of one of said sidewalls in a preselected pattern for reducing circumferential surface tension.

3 Claims, 5 Drawing Figures

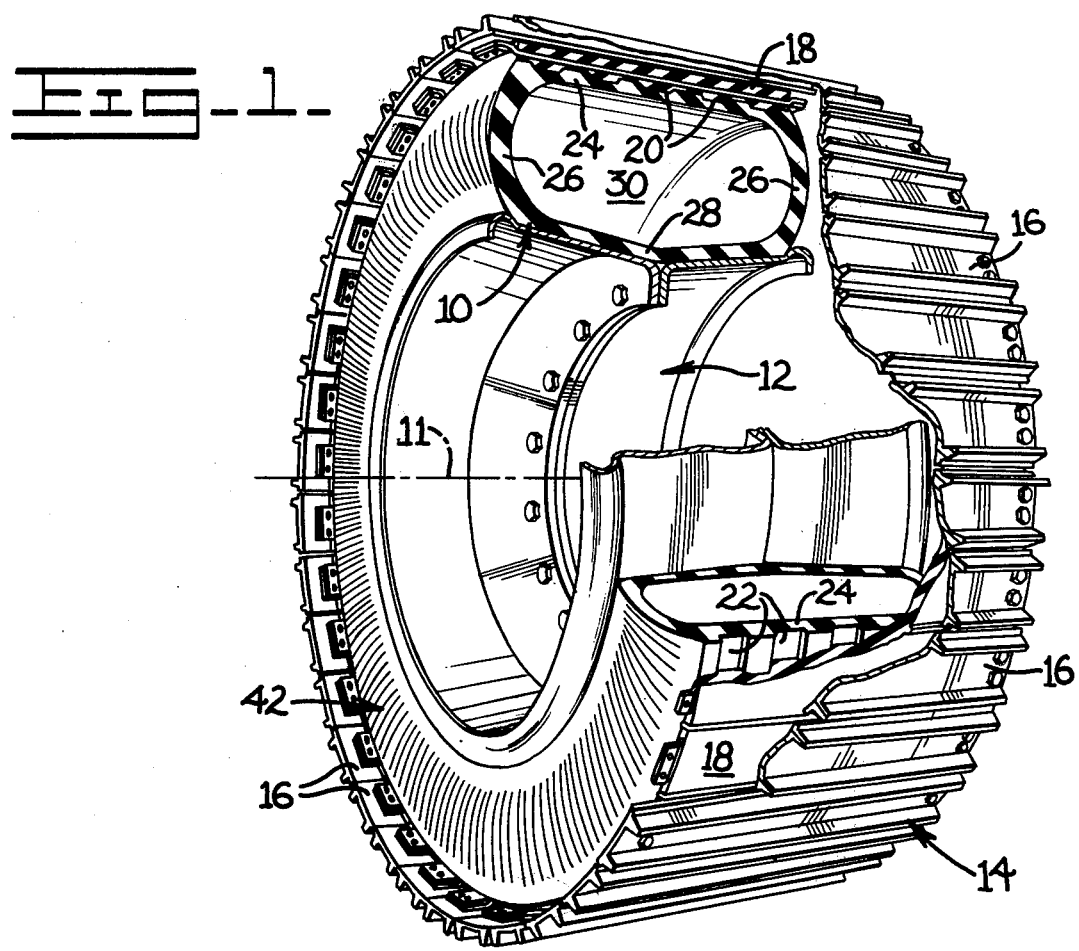
Fig-1-
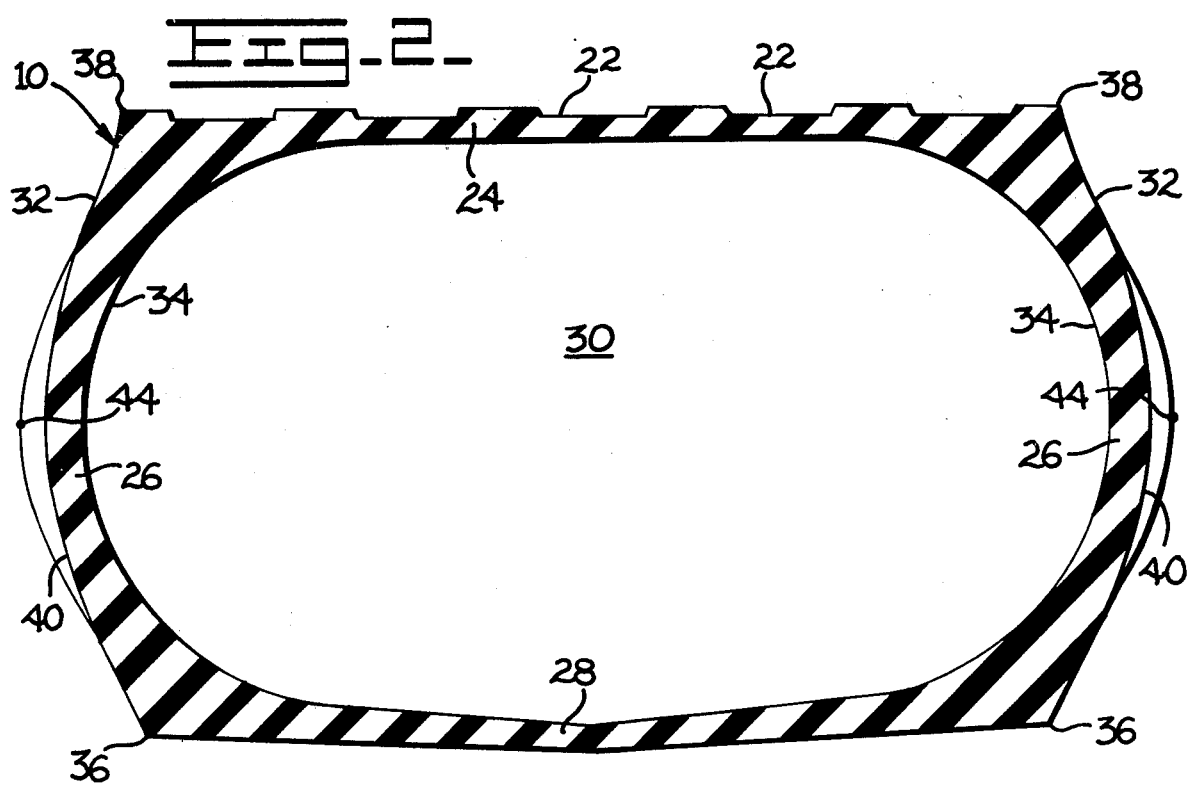
Fig-2-

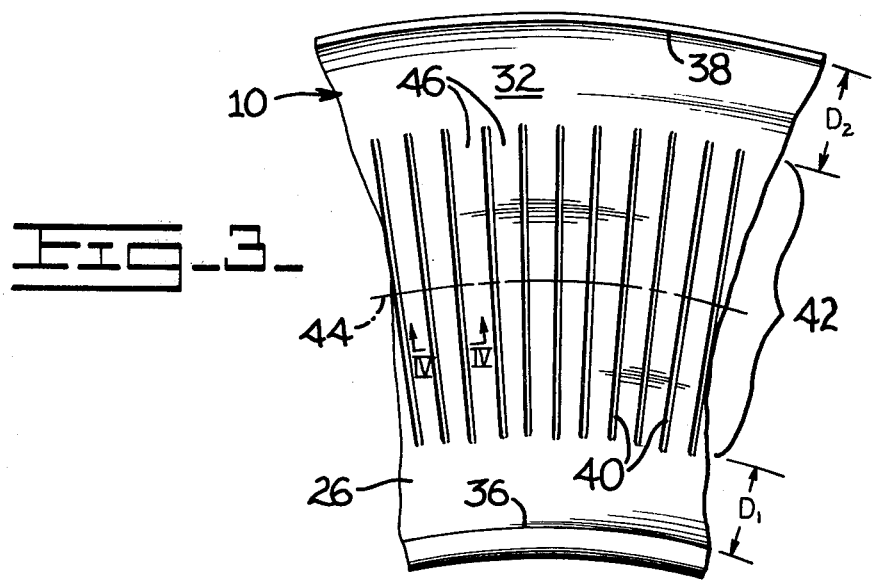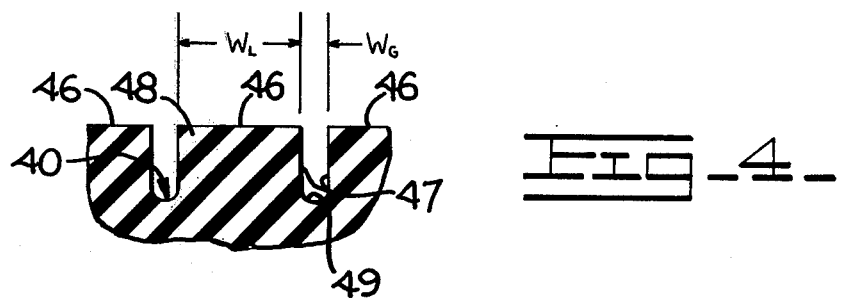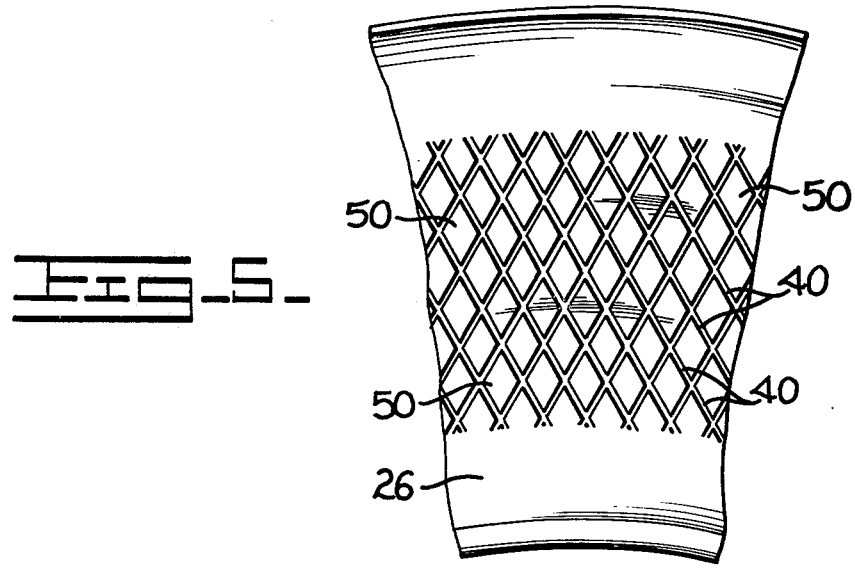

PNEUMATIC TIRE CARCASS

BACKGROUND OF THE INVENTION

This invention relates generally to a pneumatic tire carcass and more particularly to a tire carcass having cut-resistant sidewalls.

Large earthmoving tires are used in severe operating conditions where the sidewalls of the carcass are susceptible to cuts by rocks or other sharp and penetrating objects. After the sidewalls are initially cut or punctured, the sidewall cuts continue to propagate due to the cyclic operating conditions. Particularly, a radially oriented cut in the sidewall tends to open up every time that the cut is rotationally oriented downwardly or in the footprint. As a consequence, the cut continues to grow in length and in depth to the point of failure. If the remainder of the tire has useful life remaining, this is an expensive loss.

Heretofore, thicker sidewalls have been provided to improve cut resistance. However, the thicker sidewalls do not significantly reduce the tension in the rubber or elastomeric material at the surface and hence do not appreciably improve cut resistance of the tires. Moreover, not only is this a relatively expensive proposition, but also the heavier tires generally run hotter so that their durability is adversely affected.

SUMMARY OF THE INVENTION

The present invention is directed to overcoming one or more of the problems as set forth above.

According to the present invention, this is accomplished by providing a pneumatic tire carcass having a tread portion, a pair of sidewalls connected to the tread portion, each of the sidewalls having an outer surface, and a plurality of grooves in the outer surface of one of said sidewalls in a preselected pattern for reducing circumferential surface tension.

BRIEF DESCRIPTION OF THE DRAWINGS

FIG. 1 is a diagrammatic and perspective view of a tire assembly with portions broken open to better show details thereof, and including an improved tire carcass constructed in accordance with the present invention.

FIG. 2 is a diagrammatic and enlarged cross sectional view of the tire carcass shown in FIG. 1.

FIG. 3 is an enlarged, fragmentary side elevational view of the tire carcass shown in FIGS. 2 and 3.

FIG. 4 is an enlarged, fragmentary sectional view of the tire carcass of the present invention as taken along line IV—IV of FIG. 3.

FIG. 5 is an enlarged, fragmentary side elevational view of a tire carcass having an alternate construction in accordance with the present invention which may be compared with FIG. 3.

DETAILED DESCRIPTION

Referring initially to FIG. 1, a hollow toroidal or oval pneumatic tire carcass 10 having a central axis 11 is shown as being disposed on a split rim assembly 12 which is suitably mounted on an earthmoving vehicle or the like, not shown. An endless track belt assembly 14 having a plurality of relatively closely peripherally spaced rectangular track shoes 16 is mounted circumferentially on the tire carcass. The shoes of the track belt assembly are releasably connected to a cylindrical mounting belt 18, and the belt has a plurality of internal ribs 20 formed in its inner periphery for laterally interlocking engagement with a corresponding plurality of circumferential grooves 22 formed in an axially elongated, outer peripheral tread portion 24 of the tire carcass.

More particularly, the tire carcass 10 includes a foreshortened facing pair of sidewalls 26 connected to the tread portion 24, and a radially inner peripheral base 28 connected to the sidewalls to define an internal air chamber 30 within it. The tire carcass is provided with a valve stem arrangement therethrough, not shown, to enable compressed air to be delivered to the air chamber in the usual manner.

As best shown in FIGS. 2 and 3, each of the sidewalls 26 of the tire carcass 10 has an outer surface 32 and an inner surface 34. It is apparent from the drawings that the outer surface extends generally between a radially inner peripheral edge 36 defined with its intersection with the exterior surface of the base 28 and a radially outer peripheral edge 38 defined with its intersection with the exterior surface of the tread portion 24.

Pursuant to the present invention, means forming a plurality of elongated grooves 40 in the outer surface 32 of the tire carcass 10 is provided in a surface strain reducing band 42 extending continuously around at least one of the sidewalls 26. This band is preferably spaced a preselected first distance $D_1$ away from the radially inner peripheral edge 36 and a preselected second distance $D_2$ away from the radially outer peripheral edge 38 as shown in FIG. 3. Preferably also, the band is substantially radially centered with respect to a centrally disposed annular reference line 44, shown in phantom, and generally representing the axially furthest extension of the convex outer sidewall surface of the tire carcass.

As best shown in FIGS. 3 and 4 the grooves 40 define a plurality of spaced apart lands 46 having a preselected pattern. Specifically, these grooves are of a preselected construction and orientation sufficient for reducing circumferential surface tension in the elastomeric or rubber material of the tire carcass 10. It has been found to be desirable to orient a plurality of these elongated grooves in a preselected direction so that the lands define a plurality of substantially parallel ribs 48. In the instant example, the grooves are substantially radially oriented with respect to the central axis 11 and have a land or rib width $W_L$ to groove width $W_G$ ratio between 2:1 and 10:1. Preferably, such ratio is between 2:1 and 6:1, with the favored ratio illustrated in the drawings being about 4:1. This corresponds to a land width of about 20.6 mm, a groove width of about 4.7 mm, a maximum groove depth of about 12.7 mm, and a groove length of about 250 mm for a tire carcass having an overall diameter of about 215 cm. Preferably, a relatively large number of alternating grooves and ribs are provided in a uniform manner around the band. In the instant example 200 ribs are uniformly spaced about at least one of the sidewalls.

A first theoretical total surface area is defined by the grooves 40 adjacent the outer surface 32 of the band 42, a second total surface area is defined by the lands 46, with these first and second surface areas being preferably proportioned at a preselected area ratio within the range of from 10% to 35%, and with the favored ratio being about 15%. Further, it is preferable than less than 10% of the first theoretical total surface area is in any one groove in order to more uniformly distribute the grooves and lands around the band and to better interrupt surface stresses.

As best shown in FIG. 4 the cross section of the grooves 40 is generally U-shaped with opposite walls 47 and a concave root or blunt bottom 49 to avoid any abrupt transition at the root such as a sharp corner in section that could serve as a point of stress concentration. While the walls of the grooves are substantially normal to, or at right angles to, the outer surface of the sidewalls in the preferred instant example, it is contemplated that the walls could be inclined from each other to a value of less than about 30 degrees included angle of outward divergence so as to retain a substantial exterior surface area of the lands 46. As shown in FIG. 2, the opposite ends of the grooves 40 are preferably tapered in depth convergingly toward the outer surface 32 and toward the opposite edges 36 and 38 of the tire carcass substantially uniformly away from a maximum depth adjacent the annular reference line 44. This provides a root 49 that is smooth in transition along its length and avoids any sharp step that could cause a stress concentration of high magnitude.

Referring now to the alternate embodiment tire carcass illustrated in FIG. 5, it is apparent that the grooves 40 can be arranged in preselected patterns other than that illustrated in the preferred embodiment. In FIG. 5, the grooves are arranged in a crisscrossing or intersecting manner to form a waffle pattern with diamond shaped lands 50. It is mandatory, however, that the grooves be at least partly radially inclined in order to reduce surface strain in the outermost fibers of the material of the tire carcass in the circumferential direction.

In operational testing of the tire carcass 10 having the general physical construction of FIGS. 1 through 4, and with 6" long razor cuts oriented radially between the grooves to simulate a crack occurring in the field, it has been generally found that:
 a. the radial grooves 40 lower surface strain and improve cut growth resistance;
 b. as the width of the ribs 48 is decreased, surface strain is reduced and cut growth resistance is improved;
 c. groove width is realistically determined by the probability of a sharp object cutting into the base of the groove, therefore, the wider the groove, the higher the probability of cutting in the groove; and
 d. groove depth is determined by being slightly deeper than the majority of cuts initiated in the field.

It is thus apparent that the tire carcass of the present invention has a sidewall construction giving greatly improved resistance to cuts by utilizing a plurality of grooves to dramatically lower circumferential surface tension. Moreover, this is achieved without adding an excessive amount of resilient material, and the grooves advantageously serve to dissipate heat from the sidewalls. Furthermore, the grooves are arranged in a peripheral band spaced radially away from both the inner and outer peripheral edges of the sidewall so that they will be independent of any groove pattern in the tread portion and will be of minimum length to provide the desired affect only where needed.

Further, it is contemplated that the sidewall construction of the present invention is applicable to almost all types of tires, even though only a hollow toroidal pneumatic tire is shown. For example, the surface tension reducing grooves 40 can be incorporated in the sidewalls of conventional automobile tires of either the biased or radial type and having a horseshoe-shaped cross section to improve cut resistance, or in the sidewalls of a bicycle tire without departing from the spirit of the present invention.

Other aspects, objects and advantages of this invention can be obtained from a study of the drawings, the disclosure and the appended claims.

The embodiments of the invention in which an exclusive property or privilege is claimed are defined as follows:

1. A pneumatic tire carcass (10) comprising:
 a tread portion (24);
 a pair of sidewalls (26) connected to said tread portion (24), each of said sidewalls (26) having an outer surface (32) defining radially inner and outer peripheral edges (36, 38) and an annular reference line (44) located at the axially furthest extension thereof; and
 means forming a plurality of at least partly radially inclined elongate grooves (40) in said outer surface (32) of at least one of said sidewalls (26) at said reference line (44) and spaced away from said inner and outer peripheral edges (36,38) and defining a plurality of spaced apart lands (46) for reducing circumferential surface tension and propagation of cuts, each of said grooves (40) being substantially radially centered on said reference line (44) and uniformly tapered in depth away from a maximum depth adjacent said reference line (44), each of said grooves (40) having a cross sectional configuration defined by a pair of opposite walls (47) and a connecting concave root (49), said walls (47) being so constructed and arranged that said opposite walls (47) define less than about 30 degrees included angle of outward divergence, and wherein a first total surface area is defined by said grooves (40) adjacent said outer surface (32) and a second total area is defined by said lands (46), said first surface area being proportioned within a preselected range of from 10% to 35% of said second surface area.

2. The pneumatic tire carcass (10) of claim 1 wherein said first surface area is preferably about 15% of said second surface area.

3. The pneumatic tire carcass (10) of claim 1 wherein said lands (46) have a preselected land width at said reference line (44), said grooves (40) have a preselected groove width at said reference line (44), and the ratio of said land width to said groove width is between 2:1 and 6:1.

* * * * *

UNITED STATES PATENT AND TRADEMARK OFFICE
CERTIFICATE OF CORRECTION

PATENT NO. : 4,155,393
DATED : May 22, 1979
INVENTOR(S) : Charles E. Grawey

It is certified that error appears in the above-identified patent and that said Letters Patent are hereby corrected as shown below:

In column 4, line 45 after the word "total" insert the word -- surface -- .

Signed and Sealed this

Eleventh Day of September 1979

[SEAL]

Attest:

LUTRELLE F. PARKER
*Attesting Officer*    *Acting Commissioner of Patents and Trademarks*